UNITED STATES PATENT OFFICE.

ALBERT EDWARD JENS VALDEMAR JOHAN THEILGAARD, OF COPENHAGEN, DENMARK.

PROCESS OF DEVULCANIZING CAOUTCHOUC, INDIA-RUBBER, &c.

SPECIFICATION forming part of Letters Patent No. 642,764, dated February 6, 1900.

Application filed June 1, 1899. Serial No. 719,020. (No specimens.)

*To all whom it may concern:*

Be it known that I, ALBERT EDWARD JENS VALDEMAR JOHAN THEILGAARD, chemist, of Copenhagen, in the Kingdom of Denmark, have invented certain new and useful Improvements in Processes of Devulcanizing Caoutchouc, India-Rubber, Gum-Elastic, and Similar Materials, of which the following is a specification.

The object of the present invention is a process of devulcanizing caoutchouc, india-rubber, gum-elastic, and similar materials; and it consists in subjecting the vulcanized material to a treatment with such compounds that in solution are able to remove sulfur and oxygen, and especially cyanids.

The following is an example of the above-mentioned process: Vulcanized caoutchouc, divided into pieces of a suitable size, is placed in a recipient adapted for the purpose and is therein treated with a solution of cyanid of potassium or other cyanid in proportion to the amount of sulfur contained in the material subjected to the treatment. In order to accelerate the process, the temperature may be raised by means of direct or indirect steam. When the devulcanization is finished, the solution is removed and the material is washed and carefully dried. The devulcanized caoutchouc can now be formed into new articles and again devulcanized.

Having now particularly described and ascertained the nature of the said invention and in what manner the same is to be performed, I declare that what I claim is—

The process of devulcanizing caoutchouc, india-rubber, gum-elastic, and similar materials, characterized by the said materials, after being divided into pieces of suitable size, being placed in a recipient and treated with a solution of a cyanid, eventually under a raised temperature, whereupon the materials, after a thorough devulcanizing, are removed from the solution, washed, and dried.

Signed at Copenhagen, Denmark, this 20th day of May, 1899.

ALBERT EDWARD JENS VALDEMAR
JOHAN THEILGAARD.

Witnesses:
P. HOFMAN BANG,
JULES BLONG.